US007167910B2

(12) United States Patent
Farnham et al.

(10) Patent No.: US 7,167,910 B2
(45) Date of Patent: Jan. 23, 2007

(54) SOCIAL MAPPING OF CONTACTS FROM COMPUTER COMMUNICATION INFORMATION

(75) Inventors: Shelly D. Farnham, Seattle, WA (US);
Andrzej Turski, Redmond, WA (US);
William L. Portnoy, Seattle, WA (US);
David P. Vronay, Bellevue, WA (US);
Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 10/164,898

(22) Filed: Jun. 4, 2002

(65) Prior Publication Data

US 2003/0167324 A1  Sep. 4, 2003

(51) Int. Cl.
*G06F 15/173* (2006.01)

(52) U.S. Cl. ............... 709/223; 709/206; 709/224; 715/734; 715/736

(58) Field of Classification Search ............... 709/204, 709/206, 207, 223, 224, 203; 715/734, 736, 715/737
See application file for complete search history.

(56) References Cited

U.S. PATENT DOCUMENTS

| 5,956,486 | A  | * | 9/1999 | Hickman et al. | ............ 709/206 |
| 6,052,121 | A  |   | 4/2000 | Webster et al. | |
| 6,125,366 | A  |   | 9/2000 | Bernstein et al. | |
| 6,369,840 | B1 |   | 4/2002 | Barnett et al. | |
| 6,380,959 | B1 |   | 4/2002 | Wang et al. | |
| 6,389,372 | B1 | * | 5/2002 | Glance et al. | ............ 702/189 |
| 6,480,885 | B1 | * | 11/2002 | Olivier | ............ 709/207 |
| 6,594,463 | B1 | * | 7/2003 | Watanabe | ............ 399/302 |
| 6,675,197 | B1 | * | 1/2004 | Satoh et al. | ............ 709/204 |
| 6,681,108 | B1 | * | 1/2004 | Terry et al. | ............ 455/412.2 |
| 6,691,162 | B1 | * | 2/2004 | Wick | ............ 709/224 |
| 6,714,967 | B1 |   | 3/2004 | Horvitz | |
| 6,748,395 | B1 |   | 6/2004 | Picker et al. | |
| 6,832,245 | B1 | * | 12/2004 | Isaacs et al. | ............ 709/206 |

(Continued)

OTHER PUBLICATIONS

Helmut Berger et al., An Adaptive Information Retrieval System based on Associative Networks, APCCM 2004, 2004, pp. 27-36, Dunedin, New Zealand.

(Continued)

*Primary Examiner*—Saleh Najjar
*Assistant Examiner*—Faruk Hamza
(74) *Attorney, Agent, or Firm*—Amin, Turocy & Calvin, LLP (57) ABSTRACT

Social information, including computer communication information, is modeled according to a network approach, and users are provided with representations of patterns within their social spaces and graphical interface tools for navigating through the spaces. This can enhance the user's ability to seek out social information and manage their online social relationships. The social mapping includes automatically collecting computer communication information relating to multiple contacts who are in computer communication with each other, one of the multiple contacts being a selected user. The computer communication information is filtered according to one or more preselected criteria to maintain the number of contacts associated with the selected user at or below a selected threshold. The computer communication information is analyzed to determine extents of similarity between the multiple contacts. A visualization of a social map based upon the extents of similarity between the multiple contacts is rendered on a computer display screen so that a user can access and navigate information represented in the social map visualization.

35 Claims, 4 Drawing Sheets

U.S. PATENT DOCUMENTS

| | | | |
|---|---|---|---|
| 2002/0073056 A1 | 6/2002 | Broster et al. | |
| 2002/0138477 A1 | 9/2002 | Keiser | |
| 2003/0158855 A1* | 8/2003 | Farnham et al. | 707/102 |
| 2004/0003028 A1 | 1/2004 | Emmett | |
| 2004/0088325 A1* | 5/2004 | Elder et al. | 707/104.1 |
| 2004/0135816 A1* | 7/2004 | Schwartz et al. | 345/811 |
| 2006/0075044 A1* | 4/2006 | Fox et al. | 709/206 |

OTHER PUBLICATIONS

Bent Bruun Kristensen, Complex Associations: Abstractions in Object-Oriented Modeling, OOPSLA 94, 1994, pp. 272-286, Portland, Orgeon, USA.

European Search Report, EP 03 00 2118, mailed Nov. 19, 2004.

Marc A. Smith, et al., "Visualization Components for Persistent Conversations", Proceedings of the SIGCHI Conference on Human Factors in Computing Systems, Mar. 13-Apr. 5, 2001, pp. 136-143, vol. 3, No. 1, Seattle, WA.

Richard B. Segal, et al., "MailCat: An Intelligent Assistant for Organizing E-Mail", Proceedings of the Third Annual Conference on Autonomous Agents, 1999, pp. 276-282, Yorktown Heights, NY.

Nicholas Ducheneaut, et al., "E-Mail as Habitat: An Exploration of Embedded Personal Information Management", Interactions, Sep./Oct. 2001.

M. Heidegger, Being and Time, 1927, pt. 1, 50 pages (Front Cover-53).

M. Heidegger, Being and Time, 1927, pt. 2, 50 pages (54-104).

M. Heidegger, Being and Time, 1927, pt. 3, 50 pages (105-154).

M. Heidegger, Being and Time, 1927, pt. 4, 45 pages (155-199).

M. Heidegger, Being and Time, 1927, pt. 5, 51 pages (200-250).

M. Heidegger, Being and Time, 1927, pt. 6, 44 pages (251-294).

M. Heidegger, Being and Time, 1927, pt. 7, 40 pages (395-334).

M. Heidegger, Being and Time, 1927, pt. 8, 40 pages (335-374).

M. Heidegger, Being and Time, 1927, pt. 9, 40 pages (375-414).

M. Heidegger, Being and Time, 1927, pt. 10, 40 pages (415-454).

M. Heidegger, Being and Time, 1927, pt. 11, 40 pages (455-494).

M. Heidegger, Being and Time, 1927, pt. 12, 40 pages (495-535).

M. Heidegger, Being and Time, 1927, pt. 13, 40 pages (536-575).

M. Heidegger, Being and Time, 1927, pt. 14, 15 pages (576-Back Cover).

T. Windograd, Understanding Computers and Cognition: A New Foundation for Design, pt. 1, 50 pages (Front Cover-39).

T. Windograd, Understanding Computers and Cognition: A New Foundation for Design, pt. 2, 50 pages (40-89).

T. Windograd, Understanding Computers and Cognition: A New Foundation for Design, pt. 3, 50 pages (90-139).

T. Windograd, Understanding Computers and Cognition: A New Foundation for Design, pt. 4, 50 pages (140-191).

T. Windograd, Understanding Computers and Cognition: A New Foundation for Design, pt. 5, 19 pages (192-Back Cover).

J. Raskins, The Humane Interface, 2001, pt. 1, 50 pages (Front Cover-34).

J. Raskins, The Humane Interface, 2001, pt. 2, 50 pages (35-84).

J. Raskins, The Humane Interface, 2001, pt. 3, 50 pages (85-135).

J. Raskins, The Humane Interface, 2001, pt. 4, 50 pages (136-169).

J. Raskins, The Humane Interface, 2001, pt. 5, 30 pages (170-199).

J. Raskins, The Humane Interface, 2001, pt. 6, 35 pages (200-Back Cover).

M.T. Nietzel, Introduction to Clinical Psychology, 3rd Edition, 1991, Prentice Hall, Englewood Cliffs, NI, pt. 1, 50 pages (Front Cover-40).

M.T. Nietzel, Introduction to Clinical Psychology, 3rd Edition, 1991, Prentice Hall, Englewood Cliffs, NI, pt. 2, 60 pages (41-102).

M.T. Nietzel, Introduction to Clinical Psychology, 3rd Edition, 1991, Prentice Hall, Englewood Cliffs, NI, pt. 3, 50 pages (103-152).

M.T. Nietzel, Introduction to Clinical Psychology, 3rd Edition, 1991, Prentice Hall, Englewood Cliffs, NI, pt. 4, 50 pages (153-202).

M.T. Nietzel, Introduction to Clinical Psychology, 3rd Edition, 1991, Prentice Hall, Englewood Cliffs, NI, pt. 5, 50 pages (203-252).

M.T. Nietzel, Introduction to Clinical Psychology, 3rd Edition, 1991, Prentice Hall, Englewood Cliffs, NI, pt. 6, 50 pages (252-302).

M.T. Nietzel, Introduction to Clinical Psychology, 3rd Edition, 1991, Prentice Hall, Englewood Cliffs, NI, pt. 7, 50 pages (303-352).

M.T. Nietzel, Introduction to Clinical Psychology, 3rd Edition, 1991, Prentice Hall, Englewood Cliffs, NI, pt. 8, 50 pages (353-402).

M.T. Nietzel, Introduction to Clinical Psychology, 3rd Edition, 1991, Prentice Hall, Englewood Cliffs, NI, pt. 9, 50 pages (403-452).

M.T. Nietzel, Introduction to Clinical Psychology, 3rd Edition, 1991, Prentice Hall, Englewood Cliffs, NI, pt. 10, 50 pages (453-502).

M.T. Nietzel, Introduction to Clinical Psychology, 3rd Edition, 1991, Prentice Hall, Englewood Cliffs, NI, pt. 3, 15 pages (503-Back Cover).

T. Kamada et al., An Algorithm for Drawing General Uniderected Graphs, pp. 7-15, Information Processing Letters, 31.

L.C. Freeman, Visualizing Social Networks, Carnegie Mellon: Journal of Social Structure, 15 pages.

A. Cyper, Eager: Programming Repetitive Tasks by Demonstration, 1993, pp. 205-217, MIT Press, Cambridge MA.

G. A. Miller, The Magical Number Seven Plus or Minus Two: Some Limits on Our Capacity for Processing Information, 1956, pp. 81-97, Psychological Review, 63.

R. Mander et al., A 'Pile' Metaphor for Supporting Casual Organization of Information, May 3-7, 1992, pp. 627-634, CHI'92.

D.E. Rose, Content Awareness in a File System Interface: Implementing the 'Pile' Metaphor for Organizing Information, pp. 260-269, Jun. 1993, SIGIR'93, ACM, Pitsburg, PA, USA.

S. Houde, Working Towards Rich & Flexible File Representations.

S.U. Kelly, Designing for Improved Social Responsibility, User Participation and Content on On-Line Communities, pp. 391-398, Apr. 20-25, 2002, CHI 2002, Minneapolis, Minnesota, USA.

CYC: A product of CycCorp, http://www.cyc.com.

E. Backer, Computer-assisted Reasoning in Cluster Analysis, New-York, Prentice Hall, 1995, pt. 1, 40 pages (Front Cover-26).

E. Backer, Computer-assisted Reasoning in Cluster Analysis, New-York, Prentice Hall, 1995, pt. 2, 60 pages (27-86).

E. Backer, Computer-assisted Reasoning in Cluster Analysis, New-York, Prentice Hall, 1995, pt. 3, 60 pages (87-147).

E. Backer, Computer-assisted Reasoning in Cluster Analysis, New-York, Prentice Hall, 1995, pt. 4, 60 pages (148-209).

E. Backer, Computer-assisted Reasoning in Cluster Analysis, New-York, Prentice Hall, 1995, pt. 5, 60 pages (210-269).

E. Backer, Computer-assisted Reasoning in Cluster Analysis, New-York, Prentice Hall, 1995, pt. 6, 50 pages (270-320).

E. Backer, Computer-assisted Reasoning in Cluster Analysis, New-York, Prentice Hall, 1995, pt. 7, 48 pages (321-Back Cover).

S. Card et al., Readings in Information Visualization: Using Vision to Think, Morgan Kaufman Publishers, San Francisco, pt. 1, 65 pages (Front Cover-48).

S. Card et al., Readings in Information Visualization: Using Vision to Think, Morgan Kaufman Publishers, San Francisco, pt. 2, 72 pages (49-121).

S. Card et al., Readings in Information Visualization: Using Vision to Think, Morgan Kaufman Publishers, San Francisco, pt. 3, 60 pages (121-181).

S. Card et al., Readings in Information Visualization: Using Vision to Think, Morgan Kaufman Publishers, San Francisco, pt. 4, 63 pages (182-242).

S. Card et al., Readings in Information Visualization: Using Vision to Think, Morgan Kaufman Publishers, San Francisco, pt. 5, 70 pages (243-314).

S. Card et al., Readings in Information Visualization: Using Vision to Think, Morgan Kaufman Publishers, San Francisco, pt. 6, 72 pages (315-387).

S. Card et al., Readings in Information Visualization: Using Vision to Think, Morgan Kaufman Publishers, San Francisco, pt. 7, 80 pages (388-465).

S. Card et al., Readings in Information Visualization: Using Vision to Think, Morgan Kaufman Publishers, San Francisco, pt. 8, 40 pages (466-505).

S. Card et al., Readings in Information Visualization: Using Vision to Think, Morgan Kaufman Publishers, San Francisco, pt. 9, 40 pages (506-545).

S. Card et al., Readings in Information Visualization: Using Vision to Think, Morgan Kaufman Publishers, San Francisco, pt. 10, 70 pages (546-613).

S. Card et al., Readings in Information Visualization: Using Vision to Think, Morgan Kaufman Publishers, San Francisco, pt. 11, 73 pages (614-Back Cover).

S. Wasserman et al., Social Network Analysis: Methods and Applications, Cambridge, UK, Cambridge University Press, pt. 1, 45 pages (Front Cover-16).

S. Wasserman et al., Social Network Analysis: Methods and Applications, Cambridge, UK, Cambridge University Press, pt. 2, 45 pages (17-61).

S. Wasserman et al., Social Network Analysis: Methods and Applications, Cambridge, UK, Cambridge University Press, pt. 3, 50 pages (62-112).

S. Wasserman et al., Social Network Analysis: Methods and Applications, Cambridge, UK, Cambridge University Press, pt. 4, 53 pages (113-165).

S. Wasserman et al., Social Network Analysis: Methods and Applications, Cambridge, UK, Cambridge University Press, pt. 5, 53 pages (166-218).

S. Wasserman et al., Social Network Analysis: Methods and Applications, Cambridge, UK, Cambridge University Press, pt. 6, 54 pages (219-272).

S. Wasserman et al., Social Network Analysis: Methods and Applications, Cambridge, UK, Cambridge University Press, pt. 7, 50 pages (273-322).

S. Wasserman et al., Social Network Analysis: Methods and Applications, Cambridge, UK, Cambridge University Press, pt. 8, 50 pages (323-372).

S. Wasserman et al., Social Network Analysis: Methods and Applications, Cambridge, UK, Cambridge University Press, pt. 9, 49 pages (373-421).

S. Wasserman et al., Social Network Analysis: Methods and Applications, Cambridge, UK, Cambridge University Press, pt. 10, 50 pages (422-471).

S. Wasserman et al., Social Network Analysis: Methods and Applications, Cambridge, UK, Cambridge University Press, pt. 11, 50 pages (472-521).

S. Wasserman et al., Social Network Analysis: Methods and Applications, Cambridge, UK, Cambridge University Press, pt. 12, 51 pages (522-572).

S. Wasserman et al., Social Network Analysis: Methods and Applications, Cambridge, UK, Cambridge University Press, pt. 13, 40 pages (573-612).

S. Wasserman et al., Social Network Analysis: Methods and Applications, Cambridge, UK, Cambridge University Press, pt. 14, 40 pages (613-652).

S. Wasserman et al., Social Network Analysis: Methods and Applications, Cambridge, UK, Cambridge University Press, pt. 15, 32 pages (653-684).

S. Wasserman et al., Social Network Analysis: Methods and Applications, Cambridge, UK, Cambridge University Press, pt. 16, 45 pages (685-729).

S. Wasserman et al., Social Network Analysis: Methods and Applications, Cambridge, UK, Cambridge University Press, pt. 17, 45 pages (730-774).

S. Wasserman et al., Social Network Analysis: Methods and Applications, Cambridge, UK, Cambridge University Press, pt. 18, 52 pages (775-Back Cover).

* cited by examiner

SOCIAL MAPPING OF CONTACTS FROM COMPUTER COMMUNICATION INFORMATION

TECHNICAL FIELD

The present invention relates to providing inferring associations between people contacted through computer communication.

BACKGROUND AND SUMMARY

Current communication and member directory services use static, user generated information to organize contact information. People or contacts tend to be organized alphabetically or according to file hierarchies. For example, in member directory services people are commonly organized according to formal, organizational hierarchical structures. However, many relationships and groups are much more dynamic than formal, organizational hierarchical structures and people do not intuitively arrange their contacts alphabetically or according to topical hierarchies.

Computers increasingly serve as tools through which people interact and communicate with each other. Conventional computer use is task-oriented and is directed to creating items, modifying them, and storing them to non-volatile memory (e.g., hard disk drives). However, people do not view personal contacts as objects to be created, modified, or stored, and do not intuitively arrange their social contacts according to file hierarchies, or alphabetically.

A new metaphor is needed for computer social information in place of the conventional metaphors on which task-oriented computing is based. Accordingly, a social network metaphor is provided so that social items are organized depending on their relationships to each other rather than being organized according to the files and folders of conventional computing. Social information, including computer communication information, is modeled according to a network approach, and users are provided with representations of patterns within their social spaces and graphical interface tools for navigating through the spaces. This can enhance the user's ability to seek out social information and manage their online social relationships.

People tend to arrange their contacts intuitively in terms of how people and groups are related to each other, and by their importance. It would not be feasible to expect users to explicitly provide information about these dynamic groups. The present invention automatically infers these dynamic, informal relationships and groups by extracting implicit associations between people and groups from usage patterns in email and in distribution lists, for example. In one implementation, the present invention includes collecting computer communication data automatically (i.e., without user prompting), processing the data into models of network and network patterns, representing the network and network patterns to the user through graphical or textual visualizations, and providing features that allow the user to interact with the network. The implicit associations may be extracted repeatedly or periodically to accurately represent the dynamic, informal relationships between people.

An underlying theme of this invention is that people interact with each other online in the context of a social network. According to a social network perspective, individual items (persons, web pages, etc.) are viewed as interdependent and are interconnected by relational ties. The relational ties between units are channels for transfer or "flow" of resources, such as emails, files, web links, and so forth. Relational ties may vary in strength and by context. These relational ties form meaningful patterns or regularities that can be assessed automatically and exploited for the user's benefit. Patterns or regularities in a network structure are dynamic, needing to be updated automatically depending on ongoing changes in the relational ties.

Also, people tend to have an egocentric perspective when conceptualizing their social networks. People most care about how others relate to themselves. When seeking out information, navigating through a social space, or organizing items, people will generally want to start at their own place in a social network, or with people similar to or close to themselves.

Moreover, in a social context, people care about other people and their relational ties. As a consequence, in the context of online social interactions people and their relationships should be prominent in a user interface. For example, rather than initiating an online interaction through an application such as Instant Messenger, the user should be able to initiate an interaction directly through a representation of the person with whom they want to interact. In addition to making people prominent in the user interface, information about people and their relational ties should be actively employed to help people search/filter/retrieve information and objects that occupy the social space. For example, a person searching for music online should be able find mp3s that are frequently accessed by important others in his or her social network.

Finally, the success of an organization can depend on the exchange of knowledge and technology between different groups.

However, any knowledge transfer across the organization and groups depends on people's awareness of who's doing what across the groups. The challenge of developing an awareness of group activities is made more formidable by the dynamic, informal nature of the social structures for many organizations. The formal structures found through org charts and internal web pages leave out a large part of the picture. Interpersonal connections, on the other hand, provide more informal, dynamic information. Currently, such knowledge transfer across individuals depends on people's attendance at meetings and conferences or the serendipity of informal encounters.

One implementation of the present invention provides an online alternative with which users can develop an awareness of the informal social structures of an organization and exploit interpersonal connections when seeking out information. In one implementation, users are provided a web-based, interactive map that allows users to navigate for information using social, relational ties such as who is working with whom, who is working on which projects, and who is working in which groups.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
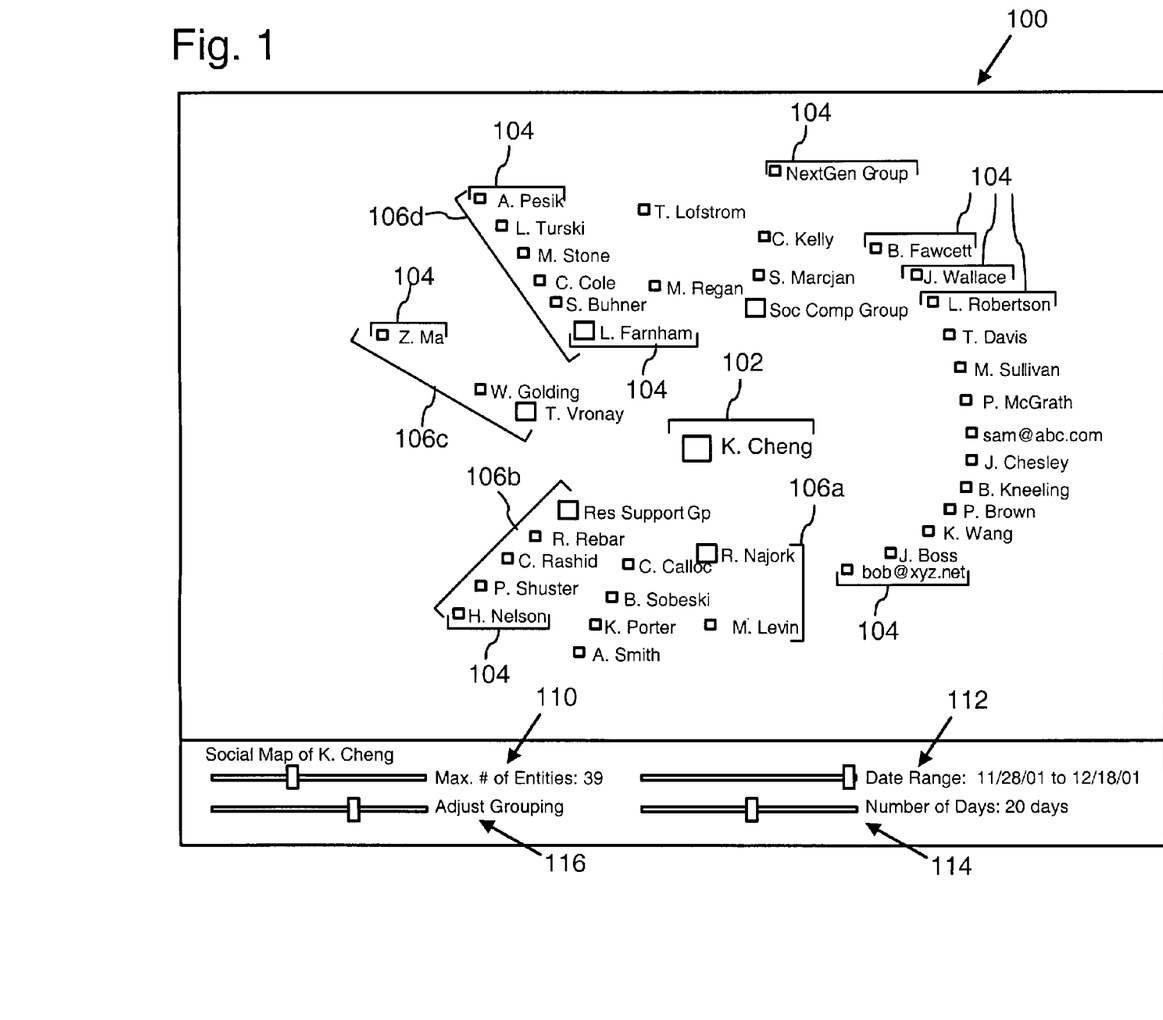
FIG. 1 is an illustration of an exemplary social map visualization as rendered on a computer display screen.

FIG. 1 is an illustration of an exemplary social map visualization 100 as rendered on a computer display screen. Social map visualization 100 illustrates and is based upon measurements of the extent of association between people who are identified individually or as groups or members of groups. In the illustrated implementation, the associations between people are based upon computer communications between the people, specifically email communications. Alternatively, other communication formats or information may separately or additionally form the basis for measuring the extent of association between people.

Social map visualization 100 is formed in relation to a selected user or person, who is indicated by a selected user symbol 102 and a username ("K. Cheng"). Social map visualization 100 includes multiple associated user symbols 104, with usernames, that correspond to other people with whom the selected user is associated. In the illustrated implementation, associated user symbols 104 are rendered in a radial sector format (e.g., "pie slices") that include clusters 106a, 106b, etc. of associated users who are commonly associated in group. Clusters 106a, 106b, etc. are referred to generally as clusters 106. Social map visualization 100 corresponds to a social space for the selected user that corresponds to selected user symbol 102 and allows inferences to be made as to the importance of people and groups, informal relationships between people, and dynamic grouping.

Social map visualization 100 is based upon automatically generated association measures between people using computer communication information. The computer communication information may include any or all of dynamic email information, distribution list membership and data, public discussion threads, instant messaging contacts, meeting attendees listed on online calendars, people or contacts with whom documents are shared, memberships in online communities, groups, games, profile information, etc. The data coming from different modes of communication, etc. can be weighted differently and dynamically varied depending on the context of use. With respect to public discussion threads (i.e., places where multiple users can contribute to the same topic), for example, it may be assumed that people contributing to the same thread share similar interests and that the number of common topics can be a measure of similarity. Social map visualization 100 provides users with dynamic representations of patterns within their social space using those association measures.

As an alternative to the sector visualization format illustrated in FIG. 1, social environments may be modeled with a network metaphor in which each item is represented in terms of its relationships to other items, as described below in greater detail. A network approach can also automatically provide users with dynamic representations of patterns within their social spaces and a means for navigating through them. Both visualization formats enhance the user's ability to seek out social information and manage their online social relationships.

Figure 2:
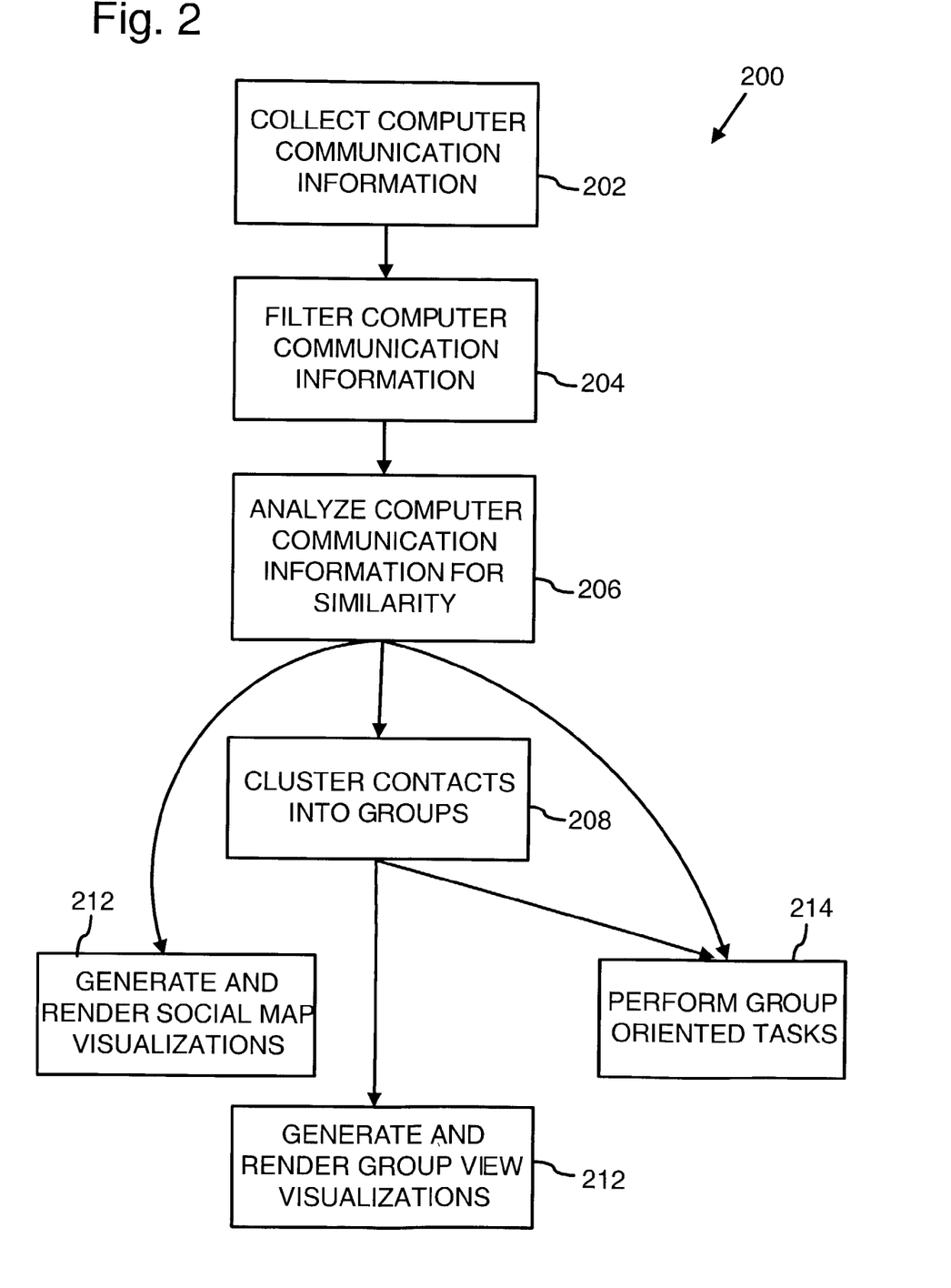
FIG. 2 is a flow diagram of a social map method for generating and rendering visualization of a social map based upon computer communication information.

FIG. 2 is a flow diagram of a computer software implemented social map method 200 for generating and rendering visualization of a social map based upon computer communication information. In one exemplary implementation, the computer communication information is obtained primarily from email message, however other implementations may employ other computer communication information, as described below. For example, social map method 200 could use any number of data sources, including client- or server-based email systems (e.g., Outlook® and Exchange® software programs), Internet- or Web-based email services (e.g., Hotmail® email services), instant messaging systems, and other communication or organizational applications.

Process block 202 indicates that computer communication information is collected relating to multiple people or compute users who are in communication with each other. For example, the computer communication information may be collected automatically, without direct user input. Moreover, the computer communication information may be collected dynamically (i.e., repeatedly or periodically) to capture changes in the computer communication information that occur over time.

In one implementation, the computer communication information is obtained from email messages, particularly identifiers of who sent and was sent email messages, as indicated in email headers. Commonly, the person who sent an email message is indicated in a "From:" field, and the person or persons who receive the email message are indicated on a "To:" field and a "Cc:" field, the latter typically indicating a secondary recipient of the message. The computer communication information may be obtained for all email messages transmitted or received during a specified time period for any grouping or email users: specifically identified users, all users served by a specified email server, all users served by a specified email domain, etc.

In another implementation, the computer communication information includes email distribution list memberships, which represent interaction patterns that can model the social structures of an organization and relationships of other people to the organization. Such distribution list memberships may be maintained on an email server or a generalized network directory, such as a network directory based upon the Lightweight Directory Access Protocol (LDAP). The Active Directory™ feature in some Windows® network operating systems available from Microsoft Corporation is an example of such a generalized network directory. In addition, the distribution list memberships may be further combined with organizational and user-generated information, such as project teams, research groups, research topics, etc.

Process block 204 indicates that the computer communication information is filtered according to one or more preselected criteria, so that the number of people (i.e., contacts) associated with the selected user may be reduced if the number is excessive. Personal social networks tend to be too large for all contacts to be included in a visualization of the network.

With regard to an implementation based upon email messages, for example, the preselected criteria may include any or all of the number of email messages in which a person or contact is listed as a sender or recipient, whether the person or contact was sent an email message by the selected user, and the relative recency of email messages to the person or contact.

In one implementation, filtering may be based upon number of occurrences, roles played, and time period. The number of occurrences for each individual is the number of times that person appears as a recipient or sender of an email. People may be sorted by the number of occurrences, and the N-number of people with the greatest number of occurrences may be selected for inclusion. For example, visualization 100 (FIG. 1) may include a user-operable graphical entity count control 110 (e.g., a slider) with which a user can select the number N of people to be included.

The roles played indicates whether the person has ever been directly emailed by the owner of the email inbox and whether the person has ever directly emailed the owner of the email inbox. People may be filtered out if they have never been directly emailed by the email inbox owner so as to eliminate people who send unsolicited email. The time period is the range of time over which the email messages to be included are transmitted. For example, visualization 100 (FIG. 1) may include one or more user-operable graphical time period controls, such as controls 112 and 114 with which a user can select a specific time range or a time period duration, respectively. This allows social map visualization 100 to show how it changes over time. In one implementation, a default time period is 20 days.

With regard to an implementation based upon email distribution list memberships, for example, a generalized network directory may be filtered for members of an organization or a part of it. Then a search may be conducted for all distribution lists that have some members from the organization.

Process block 206 indicates that the computer communication information is analyzed to determine extents of similarity between the people or contacts. In one implementation, a measure of similarity is determined between every pair of people or contacts.

With regard to an implementation based upon email messages, for example, the similarity between two people may be defined as the number of email messages on which they co-occur. In one implementation, two measures of similarity are defined: local and global similarity. Both measures range from 0 to 1, where 1 corresponds to perfectly similarity.

Local similarity is the similarity between two people normalized such that it is 1 if those two people always co-occur 0 if they never co-occur. Local similarity $LS_{ab}$ between two people (person's a and b) is equal to twice the co-occurrence frequency ($N_{ab}$) of those two people divided by the sum of the individual occurrence frequencies ($N_a$ and $N_b$) for those two people:

$$LS_{ab}=(N_{ab})/(N_a*N_b)^{1/2}$$

The local similarity indicates a proportion of occurrences in which the two people occur together. It will be noted that two people can be very similar to each other (e.g., co-occurring 100% on all emails on which they appear) without frequently occurring in the user's inbox.

Global similarity $GS_{ab}$ is the similarity between two people normalized such that it is 1 if those two people always co-occur and 0 if they never co-occur. It is equal to the co-occurrence frequency of those two people divided by the maximum number of occurrences for any person. This number provides a measure of the importance of the person/cluster to the user.

$$GS_{ab}=N_{ab}/N_{total}$$

With regard to an implementation based upon email distribution list memberships, for example, similarity between people may be defined as the number of distribution lists on which they co-occur. (Conversely, similarity between groups may be defined as the number of shared members.) Also, similarity measures may be weighted by the size of the group, such that people are less similar if they share membership in large groups than in small groups. As an alternative to weighting them by size, groups such as distribution lists may be weighted by their usage.

Usage is often inversely related to size (large groups tend to be used less) and, as a weighting factor can eliminate inactive groups.

The number of distribution lists on which two people co-occur corresponds to the extent to which their group memberships overlap. Groups may include any or all of distribution lists, research groups, project teams, research topics, etc. The impact of each group on the similarity measure depends on the size of the group, such that a smaller group size would lead to people being more similar. Similarity values are calculated separately for each group type (distribution list, research group, research project team, research topic, etc.) and are then combined using a weighted sum.

Below is one formula that may be used for weighting the similarity values depending on the size of the groups. The function strongly weights groups ranging between 0 and 10, and then drops suddenly between 10 and 25 so that by the time groups are about 30 they have very small weights.

$$\text{weight} = \frac{1}{2} - \frac{1}{\pi}\arctan\left(-3 + \frac{1}{10}(\text{number\_of\_people})^{\frac{6}{5}}\right)$$

Similarity between groups is measured by the extent to which they share the same members. The impact of each person on the similarity measure depends on the number of other groups to which that person belongs, such that a smaller number of group memberships carries a higher weight.

Process block 208 indicates that people or contacts are optionally clustered into groups through cluster analyses. The clustering analysis is related to the desired final task, not the initial data. For example, cluster analyses may be used to draw or provide a sector view and to perform some group-oriented tasks, for example, but are not required to determine social maps generally. In the exemplary implementations described above, a sector view is used as a default visualization for email data and a map view is used as a default for distribution list data. However, the view may be switched for each data set.

In one implementation, every person is at first placed in his or her own cluster. The similarity between every pair of clusters is the local similarity between the people in those clusters. Then, the two closest clusters are merged. The new similarity between the merged cluster and every other cluster is calculated using the standard complete linkage method from cluster analysis, described in Cluster Analysis, Quantitative Applications in the Social Sciences, Aldenderfer, Mark S. & Roger K. Blashfield, Sage, Beverly Hills, 1984. Finally, this merging process is repeated until a certain tolerance level has been achieved (i.e., where the clusters must be similar enough to be clustered together). The tolerance level may be set by the user, and may be adjusted interactively by viewing how it affects the social map. For example, visualization 100 (FIG. 1) may include a user-operable graphical clustering control 116 with which a user can select the tolerance level for clustering.

In one implementation, a modified form of hierarchical cluster analysis is used to group people together if they share a high degree of similarity. Hierarchical cluster analysis is described in Cluster Analysis, Quantitative Applications in the Social Sciences, Aldenderfer, Mark S. & Roger K.

Blashfield, Sage, Beverly Hills, 1984. The operations of steps 204, 206, and optionally 208, may be referred to as a data processing phase of method 200.

Process block 210 indicates that a group view visualization of a social map is generated and rendered on a computer display screen. In one implementation based upon email messages, for example, people and groups are represented with a sector view, as illustrated in FIG. 1. The sector view is most easily understood with a pie chart metaphor. As illustrated in FIG. 1, visualization 100 is rendered with respect to a selected user symbol 102, which is positioned generally centrally in visualization 100. Each cluster 106 of people or contacts 104 is positioned in its own radial section or wedge of "pie."

Within each cluster 106, contacts 104 are arranged with a distance from central selected user symbol 102 that is inversely proportional to the global similarity of each contact 104 with the selected user. As a result, contacts 104 with greater similarity are positioned closer to selected user symbol 102. The contacts 104 of different clusters 106 may be rendered in different colors to further indicate their relationships and to distinguish them from adjacent clusters.

In addition to providing a representation of similarities between contacts and groups of them, visualization 100 includes the functionality of a conventional alphabetic contact list. User interactions with visualization 100 may include navigation, re-clustering, and emailing. For example, user's can graphically activate (i.e., "click on") any contact 104 in visualization 100 to designate that contact as the selected user 102. As a result, visualization 100 re-rendered based upon the newly designated selected user 102, which is rendered centrally with the remaining contacts arranged in a sector view relative thereto based upon similarities.

The clustering algorithm in one implementation assigns each contact other than the selected or "centered" person to exactly one group. Re-clustering centered on any user provides a way to go beyond the single group assignment. By selecting or centering any contact, one may visualize all the different groups the person is associated with. Alternatively, one may use different clustering algorithms that may not have this limitation.

User's can re-cluster contacts 104 by selecting different clustering tolerance levels with graphical control 116 (FIG. 1). Users can initiate an email message to any contact 104 or cluster 106 by activating an alternate graphical selection (e.g., a "right-click") and selecting from among a menu of options that include initiating an email message to the specified contact 104 or cluster 106. Initiating an email message may include opening a new email message window and populating the "To:" field with the specified contact 104 or cluster 106. Features of the present invention may be associated or integrated with email client software.

As another implementation, the visualization may include a list view in which contacts, groups, and clusters are listed, such as in a text table. The contacts, groups, and clusters may be identified by name, for example, and the table may include additional information such as level of similarity, contact information, etc. In addition, the contacts, groups, and clusters in the list view may be selectively sorted by name, level of similarity, etc.

Figure 3:
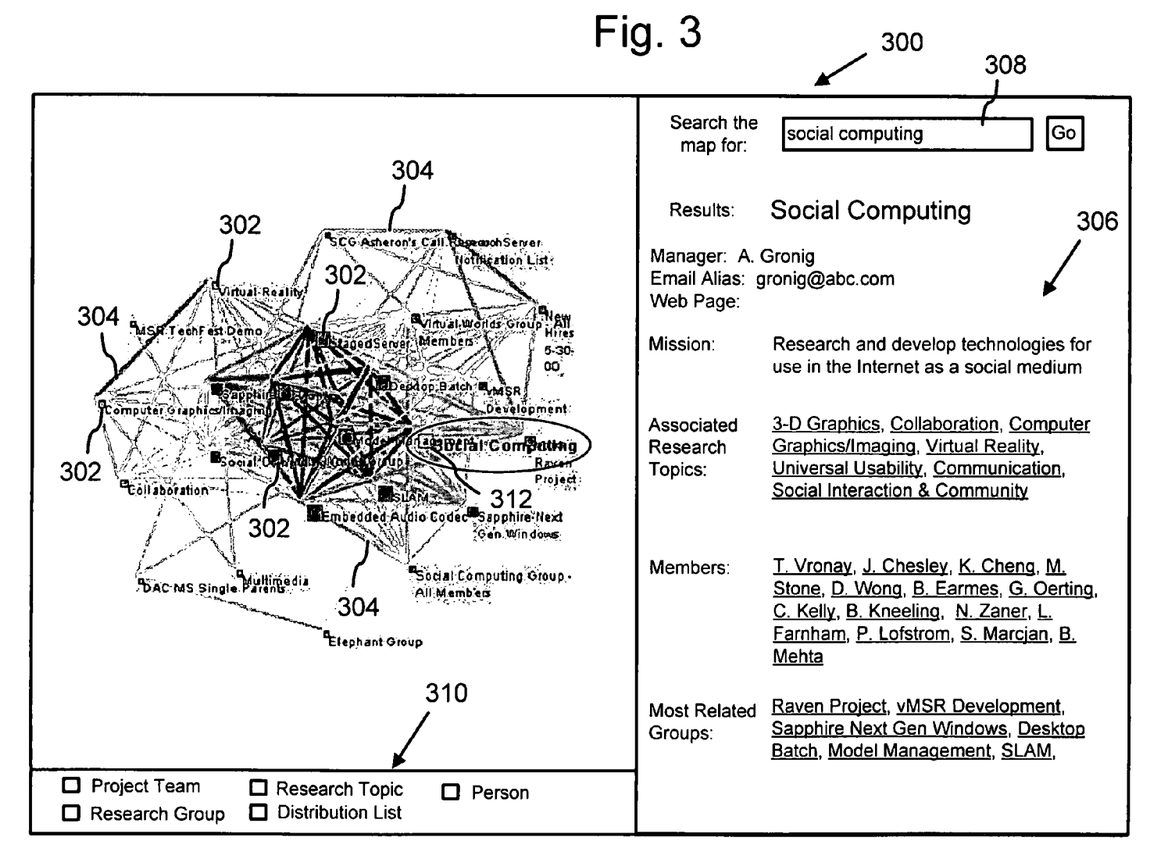
FIG. 3 is an illustration of another exemplary social map visualization as rendered on a computer display screen.

Process block 212 indicates that a non-clustered visualization of a social map is generated and rendered on a computer display screen based upon the analysis of computer communication information provided at process block 206. A non-clustered visualization of a social map may be generated and rendered without the clustering analysis of process block 208. In one implementation, people and groups are represented with a graph view, as illustrated in FIG. 3, for example, and described in greater detail below.

Process block 214 indicates that group oriented tasks may be performed without any explicit visualization being rendered. One example of such a task is a dropdown menu in an otherwise conventional email client (e.g., Outlook® personal information management software available from Microsoft Corporation), the dropdown menu providing suggested additional names based on the similarity association with the names already on the To: or Cc: line of an email being composed. Another example is an "email the group" item as a right button click menu selection. Another example is a contact manager on a handheld computing device that orders the names by their importance/frequency of use, thereby making the best use of the limited screen area. As shown in FIG. 2, the group oriented tasks may or may not use the results of the clustering analysis of process block 208.

As another implementation, computer tracking of communication information may be applied to telephonic communications, such as those tracked by computing devices integrated in some telephone systems or telephone handsets (e.g., mobile or cellular telephones). For example, some digital mobile telephones include integral, computer-controlled call tracking features and address book features. The call tracking features can function to provide automatic computer tracking of telephonic communication information, including telephone numbers called and telephone numbers from which calls are received. In some cases, these tracked telephone numbers are correlated with telephone numbers stored in the integral address book in the telephone.

Social map method 200 may generate or use social mapping in connection with computer tracking of telephonic communication information. As one example, contacts listed in a mobile telephone address book, together with a history of calls made to or from them, may be downloaded from the mobile telephone to a computer operating social map method 200. As a result, the social map generated by social map method 200 can include and incorporate the computer-tracked telephonic communication information with computer-based communication information. Alternatively, social map method 200 can be applied to computer-tracked telephonic communication information alone.

In another example, a social map that is generated by social map method 200 may be downloaded to a telephone system or a mobile telephone so that names in the address book can be selectively ordered by their importance/frequency of use. This implementation can simplify making calls to related people. The social map may be generated with or without computer-tracked telephonic communication information.

FIG. 3 is an illustration of an exemplary social map visualization 300 as rendered on a computer display screen. Social map visualization 300 includes a graph view of a network of nodes 302 and connections 304. People and groups are placed on the graph as nodes 302 so that the strength of the relational tie between people and between groups is represented by distance on the graph, and lines 304 are drawn for the stronger relational ties. For example, social information may be rendered onto a 2-dimensional plane using an algorithm similar to that of a spring model, in which the error between actual similarity values and distances between items is minimized.

Social map visualization 300, sometimes referred to as a connections map, provides users with a social map that allows them to navigate for information using the connections between people and groups. Each node 302 in visualization 300 corresponds with profile information that may be displayed in a profile window 306, for example. Users may search for information in the connections map 300 by entering text into a "search" text box 308, by graphically activating (i.e., "clicking on") nodes 302 or connections 304 in the map, or by clicking on information in the profile section 306. In addition, nodes 302 may be rendered with different colors that indicate the type of contact or group represented by the nodes, with a node color key 310 (shown in black line format) indicating which node colors correspond to the type exemplary contacts or groups project team, research group, research topic, distribution list, and person.

Once it is selected, an item will appear near the center of the map 300, items similar to it will appear around it on the map, and a profile of the selected item is rendered in profile section 306. In the illustrated example, a search for "social computing" results in a selected node 312 (circled for clarity) being rendered with its associated nodes 302 and connections 304. Profile section 306 includes information about the group, including its manger, mission, associated research topics, and members. The underscored associated research topics and members in profile section 306 are separate items that may be "clicked on" or activated to generate a corresponding visualization 300. Profile section 306 may also include a listing of the most closely related, or similar, contacts.

Users can explore the network for deeper information by graphically activating (i.e., "clicking on") the nodes 302 and the connecting lines 304. In one implementation, a user may graphically "hover" (i.e., position a graphical cursor, without activating it) over a node 302 for a contact to have displayed group memberships for the contact. The group membership information may be rendered in a pop-up box, such as of the type sometimes referred to as a "tool tip." A user may graphically hover over a line 304 between two contacts 302 to have displayed overlapping group memberships of the two contacts. A user may graphically hover over a group to have displayed the members of that group. A user may graphically hover over a line between two groups to have displayed the overlapping members in the groups.

In one implementation a spring model is used for the graph visualization 300. The spring model is described by Tomihisa Kamada and Satoru Kawai in: An Algorithm For Drawing General Unidirected Graphs, Information Processing Letters 31 (1989) 7–15. With the model, the objects of the graph are assumed to be connected by invisible springs, which have a rest length corresponding to the similarity of the objects: the closer the relationship, the shorter the spring. Ideally, if all the distances are to be at their preferred length, the structure would need to be represented in N-1 dimensions, but a satisfactory 2-dimensional representation can be achieved by minimizing the total energy of the springs. The total energy in the spring model may be expressed by the formula:

$$E = \sum_{i \neq j} \frac{1}{2} k_{ij}(r_{ij} - l_{ij})^2$$

where $r_{ij}$ is the distance between objects, $k_{ij}$ is the spring constant, and $l_{ij}$ is the spring rest length.

Two properties of this formula should be pointed out. When the distances between objects grow large, the energy of the system grows as the square of the distance. That keeps the objects confined to a limited area (which is good for on-screen presentation), but it also represents a non-local interaction, i.e. the object's position may be heavily affected by the objects on the other side of the graph. On the other hand, when the distance between objects goes to zero, the spring energy goes to a finite value. It means the repulsive force of the springs is not enough to prevent the objects from coming on top of each other, which may affect graph readability.

The spring model is satisfactory for a small number of objects (approximately 2 to 10) that are all related to each other. The spring model is less satisfactory when applied to a larger set of objects. In particular, problems can arise with graph sections (i.e., individual objects or tightly coupled clusters of objects) that are loosely coupled to other sections. The naive expectation is that unrelated or loosely related sections should appear next to each other and separated by as large gaps as possible. The resulting graphs had the sections overlapping each other, with the distance between unrelated objects often much less then between the related ones, as illustrated in FIG. 4

Figure 4:
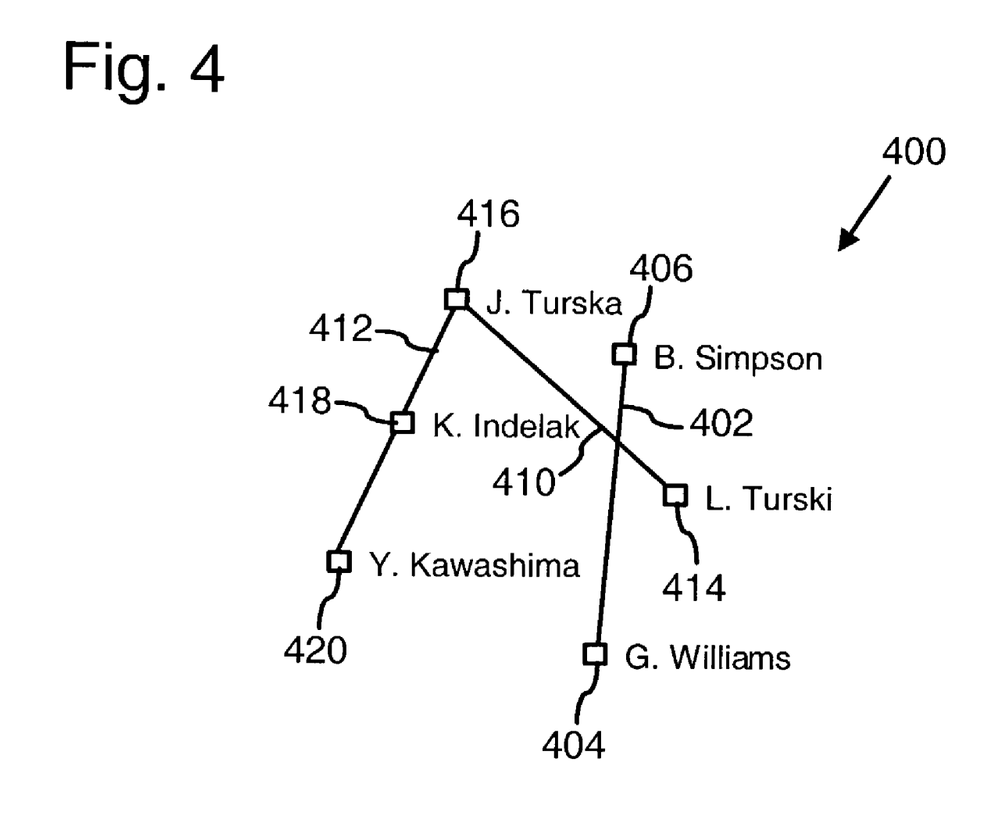
FIG. 4 shows a section of a graph view based upon the spring model defined above and rendered on a two-dimensional display.

FIG. 4 shows a section of a graph view 400 based upon the spring model defined above and rendered on a two-dimensional display. Graph view 400 includes a line 402 to represent similarity between contacts 404 and 406, and a pair of lines 410 and 412 to represent similarity between contacts 414–420. In graph view 400 item 406 is rendered too close to unrelated items 414 and 416 relative to their related items 418 and 420.

To correct these issues, the present model uses a combination of a repulsive force proportional to the inverse of the distance value squared ($1/r_{ij}^2$) and an attractive force growing linearly with the distance value. This is loosely based on the physical model for quark-quark interactions, where the first term is an electrostatic repulsion and the second one is a string-like confinement. In this model, the total energy is expressed by the formula $$E = \sum_{i \neq j} \left( \frac{Z}{r_{ij}} + \frac{1}{2} k_{ij} r_{ij}^2 \right)$$

Here, Z is a coefficient defining the strength of the repulsive term (using electrostatic analogy, it would be a product of electric charges). In general, Z should be a function of a pair of objects (i.e. $Z_{ij}$), but in this model Z is set to be a constant. Moreover, since the goal is to determine the positions of the objects at the energy minimum, rather than the energy value itself, any constant factor in the energy formula is irrelevant. Therefore, without lack of generalization, the value of Z may be set to 1.

Coefficients $k_{ij}$ correspond generally to spring coefficients of imaginary springs connecting the objects. This is similar to the conventional spring model, except that the rest length of the springs is now assumed to be zero. However, due to the presence of the repulsive force, the distance between two objects at rest is given by the formula:

$$l_{ij}^3 = \frac{Z}{k_{ij}}$$

To position objects with greater similarity closer to each other, the coefficients $k_{ij}$ may be assumed to be proportional to the measures of similarity $s_{ij}$ ($0 \leq s_{ij} \leq 1$).

$$k_{ij} = k s_{ij}$$

The global coefficient k defines the scale of this model. The minimal distance between objects (i.e. the distance between two objects of similarity 1) is $\sqrt[3]{Z/k}$. To constrain or bound all objects in the graph to a display screen area, a focal point is defined with regard to the object that is located at the center of the graph and is referred to by all other objects. Accordingly, all other objects are connected to the focal point with an additional spring, which results in the following energy formula:

$$E = \sum_{i \neq j} \left( \frac{Z}{r_{ij}} + \frac{1}{2} k s_{ij} r_{ij}^2 \right) + \sum_{j \neq 0} \frac{1}{2} b r_{0j}^2$$

Now, $\sqrt[3]{Z/b}$ is an approximate size of the graph, and the ratio k/b defines the size of the clusters of related objects relative to the size of the whole graph (i.e., a clusterization ratio).

How people interact with a network will depend on the goals supported by the application. Examples of four forms of interaction that may be employed are those of a) exploratory navigation across the network, b) organization of information using network information (e.g., organize all my emails by dynamic cluster), c) communication with individuals and groups in the network (e.g., email everyone in this dynamic cluster), and d) searches/filtering/information retrieval using network relational information (e.g., "who am I most similar to in this network?" "Who do I care about the most?" "Who is most important in this network?").

The two implementations are described hereinabove: one uses email behavior to dynamically create an interface that represents a user's personal social network, and the other provides a map of the connections between co-workers and work projects in an organization. Both implementations draw data from various data sources and use that data to develop mathematical models of social networks. These models are then used to develop graphical displays with which the user interacts.

The personal social networks are inferred by analyzing patterns in user email behavior. For example, similarities between people are measured through counts of how often their names co-occur in email messages. Users are then provided with personal social network visualizations that can be used as emailing and grouping tools, thereby fostering a user's easy navigation to and interaction with important individuals and dynamic groups.

The personal social networks are based upon the expectation that past email behavior will provide a fairly accurate approximation of who users care about, and how users implicitly cluster or organize contacts in their minds. Thus past email frequency and clustering behavior can be used to help future email and clustering behavior. It is also expected that patterns in personal social networks will allow users to search for specific emails or contacts and organize to their contact lists. Examples of these applications are illustrated by the following scenarios.

Scenario 1: Bob wants to call his friend Jerry, but does not remember Jerry's phone number. Bob's conventional alphabetic contact list has grown to the point of being cumbersome. Rather than search for Jerry's contact information through the standard alphabetical list, which is difficult to navigate and does not order by importance, Bob goes to his personal social map to see the 40 people he has most been in contact with in the last 120 days. Bob right clicks on Jerry's name and gets Jerry's contact information.

Scenario 2: Bob wants to create a Distribution List out of the names of the people who have been working on one of his projects. They have been emailing each other about the project extensively over the past week, so Bob knows they will be clustered together. Bob decides to sort his contact list by dynamic clusters. He right-clicks on the appropriate cluster and creates his Distribution List.

Scenario 3: Bob wants to email a person he emailed several times a few weeks ago. Bob cannot remember the person's name, but remembers that the person designated under "CC:" to receive several email Bob had sent to Joe. Bob types Joe's email alias in the "To:" field of his email message, right clicks and then clicks on an insert related people option. The person's name, Jim, appears in the "To:" field next to Joe's name.

Scenario 4: Bob wants to throw a surprise birthday party for his co-worker John. Rather then using their workgroup distribution list, which would include John and spoil the surprise, Bob starts with the dynamic cluster that happens to involve the same people. With a right click on the cluster, Bob creates a new mail with all the names pre-filled in the To: line. Then, Bob then deletes the John's name and adds John's wife instead. This example shows the flexibility associated with lightweight dynamic clusters compared to traditional distribution lists.

The map of the connections between co-workers and work projects in an organization allows users to explore relationships between co-workers and work projects. The map models the social structures of an organization (and the relationships of others who interact with the organization) using the interaction patterns encapsulated by distribution list memberships. For example, similarities between people are measured through counts of how often the people co-occur in groups, projects, work topics, and distribution lists.

This map provides users with a social map that allows them to navigate for information using the connections between people and groups. Each node in the graph corresponds with profile information that may be displayed in profile window 306 (FIG. 3), for example. The map of connections may be implemented as a web site that is accessible within the organization. For example, the map may be generated by a module that is implemented as a COM object. Result of the map generation may be returned as XML data describing the positions of all the points on the map. The XML data may be is returned to the user's client computer where the final rendering takes place.

Users may search for information in the connections map by entering text into the "search" text box 308, by graphically activating (i.e., "clicking on") items in the map, or by clicking on items in the profile section 306. Once it is selected, an item will appear in the center of the map 300, items similar to it will appear around it on the map, and a profile of the selected item is rendered in profile section 306. Examples of applications of the connections map are illustrated by the following scenarios.

Scenario 1. Jane has no idea who is working on issues related to natural language processing in an organization. She goes to a web site implementing the connections mapping of this invention and types in "natural language processing" into the search text box 308. From the resulting visualization 300, she sees that "natural language processing" is primarily connected to a Natural Language Processing group, but that several people from other groups are also working within the domain of natural language processing projects. Furthermore, she notices that the natural language processing group has a strong connection to the Speech Technology group.

Scenario 2. Jane has a vague memory of learning about a 3D graphics project from someone she has met in an organization. She cannot remember the project name, but does remember the person's name. She goes to web site implementing the connections mapping and types in the person's name. She sees that he has worked on a project called the Virtual Works Platform. She toggles to the projects view, and by navigating along the links around the Virtual Works Platform she sees that most of the people who worked on that project now work on new projects.

Scenario 3: Jane has a question related to Chinese user interfaces that she wants to send an email about. She searches for "user interface" keyword and finds that the "Multimodal User Interface group" is probably the one she needs to talk to. But this is a name of the group, and not a distribution list she can send an email to. She checks the map and finds that the closest distribution list with a cryptic name 'MSRCNUIe' shares most of the members with the Multimodal User Interface group and may be her best choice for the email.

People, their relationships, network clusters and network patterns may be represented to the user using a variety of methods. In addition to methods described in Aldenderfer, & Bashfield, 1984; referenced above, methods are also described in Card, S., Mackinlay, J., & Scheiderman, B. (1999). Readings in Information Visualization: Using Vision to Think. San Francisco, Morgan Kaufman Publishers., Freeman, L. C. Visualizing Social Networks. [http://carnap.ss.uci.edu/vis.html], and Wasserman, S., & Faust, K. (1994) Social Network Analysis: Methods and Applications. Cambridge, UK: Cambridge University Press. These methods vary in complexity, ranging from the simple link representations used in web pages, to complex diagrams modeled after neural nets. How networks are represented to the user will depend on the functionality of the application. For example, if the goal is to aid people in sorting their emails, dynamic clustering of emails could be represented to users simply through the order in which emails are listed in their inboxes.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

The invention claimed is:

1. In a computer readable storage medium, social mapping software for mapping contacts from computer communication information, comprising:

software for automatically collecting computer communication information relating to multiple contacts who are in computer communication with each other, one of the multiple contacts being a selected user;

software for filtering the computer communication information according to one or more preselected criteria to maintain the number of contacts associated with the selected user at or below a selected threshold;

software for analyzing the computer communication information to determine extents of similarity between the multiple contacts; and     software for generating and rendering on a computer display screen a visualization of a social map based upon the extents of similarity between the multiple contacts;

the visualization of the social map includes a sector view or a graph view to display extents of similarity between the multiple contacts.

2. The medium of claim 1 in which the computer communication information includes email messages.

3. The medium of claim 2 in which the computer communication information is obtained from identifiers of who sent and was sent email messages.

4. The medium of claim 1 in which the computer communication information includes email distribution list memberships.

5. The medium of claim 1 in which the filtering of the computer communication information includes filtering according to a number of occurrences in which each contact is identified in the computer communication information.

6. The medium of claim 1 in which the filtering of the computer communication information includes filtering according to whether contacts are directly related with each other in the computer communication information.

7. The medium of claim 1 in which the filtering of the computer communication information includes filtering according to whether the computer communication information is associated with a predefined time period.

8. The medium of claim 1 in which the filtering of the computer communication information includes filtering according to whether contacts are members of an organization or a part of the organization.

9. The medium of claim 1 in which the extents of similarity between the multiple contacts include local similarities between pairs of contacts, each local similarity indicating a proportion of occurrences in the computer contact information in which the pair of contacts occur together.

10. The medium of claim 1 in which the extents of similarity between the multiple contacts include global similarities between pairs of contacts, each global similarity indicating a proportion of occurrences in the computer contact information in which the pair of contacts occur together relative to the greatest number of occurrences in the computer communication information for any contact.

11. The medium of claim 1 further comprising software for clustering the contacts into groups according to the similarities of the contacts and including the groups in the visualization rendered on the computer display screen.

12. The medium of claim 1 in which the computer communication information is collected dynamically to capture automatically changes over time in the computer communication between the multiple contacts.

13. In a computer readable storage medium, social mapping software for mapping contacts from computer communication information, comprising:

software for automatically collecting computer communication information relating to multiple contacts who are in email communication with each other, one of the multiple contacts being a selected user;

software for filtering the computer communication information according to one or more preselected criteria to maintain the number of contacts associated with the selected user at or below a selected threshold;

software for analyzing the computer communication information to determine extents of similarity between the multiple contacts;

software for clustering the contacts into groups according to the similarities of the contacts;

software for generating and rendering on a computer display screen a visualization of a social map based upon the extents of similarity between the multiple contacts and including the groups in the visualization; and software for generating and rendering on a computer display screen a visualization of a social map that includes a sector view or a graph view to show extents of similarity between the multiple contacts.

14. The medium of claim 13 in which the filtering of the computer communication information includes filtering according to a number of occurrences in which each contact is identified in the computer communication information.

15. The medium of claim 13 in which the filtering of the computer communication information includes filtering according to whether contacts are directly related with each other in the computer communication information.

16. The medium of claim 13 in which the filtering of the computer communication information includes filtering according to whether the computer communication information is associated with a predefined time period.

17. The medium of claim 13 in which the extents of similarity between the multiple contacts include local similarities between pairs of contacts, each local similarity indicating a proportion of occurrences in the computer contact information in which the pair of contacts occur together.

18. The medium of claim 13 in which the extents of similarity between the multiple contacts include global similarities between pairs of contacts, each global similarity indicating a proportion of occurrences in the computer contact information in which the pair of contacts occur together relative to the greatest number of occurrences in the computer communication information for any contact.

19. The medium of claim 13 in which the computer communication information is collected dynamically to capture automatically changes over time in the computer communication between the multiple contacts.

20. A social mapping visualization rendered on a computer display, comprising:

a social map visualization of plural contacts identified from automatically collected computer communication information, one of the plural contacts being a selected user, wherein the computer communication information is filtered according to one or more preselected criteria to maintain number of contacts associated with the selected user at or below a selected threshold;

the visualization further including indications of established extents of similarity between plural contacts and social contact information rendered for at least the selected user, the plural contacts are clustered into groups according to similarities of the contacts and are rendered either with a sector view or a graph view to display extents of similarity between the plural contacts.

21. The visualization of claim 20 in which the computer communication information includes email messages.

22. The visualization of claim 20 in which the computer communication information includes email distribution list memberships.

23. The visualization of claim 20 further comprising a user operable graphical control for selecting the filtering threshold to limit the number of plural contact rendered in the visualization.

24. The visualization of claim 20 further comprising a user operable graphical control for selecting a grouping control to set the extent to which similarities between the contacts cause them to be rendered in clusters in the visualization.

25. The visualization of claim 20 further comprising a user operable graphical control for selecting a time period to specify a time period over which the plural contacts are identified from the computer communication information.

26. The visualization of claim 20 in which the graph view is based upon an attractive spring model and a separate repulsive model component to provide increased separation between dissimilar contacts.

27. The visualization of claim 20 in which the graph view is based upon an attractive spring model and a separate repulsive model component to provide increased separation between dissimilar contacts, and further includes an attractive spring component directed to a display screen focal point to constrain the plural contacts to a predefined display screen area.

28. In a computer readable storage medium, social mapping software for mapping contacts from computer-tracked communication information, comprising:

software for collecting computer-tracked communication information relating to multiple contacts who are in communication with each other, one of the multiple contacts being a selected user;

software for filtering the computer-tracked communication information according to one or more preselected criteria to maintain the number of contacts associated with the selected user at or below a selected threshold;

software for analyzing the computer-tracked communication information to determine extents of similarity between the multiple contacts; and software for generating a social map in either a sector view or a graph view based upon the extents of similarity between the multiple contacts.

29. The medium of claim 28 in which the filtering of the computer-tracked communication information includes filtering according to a number of occurrences in which each contact is identified in the computer-tracked communication information.

30. The medium of claim 28 in which the extents of similarity between the multiple contacts include local similarities between pairs of contacts, each local similarity indicating a proportion of occurrences in the computer contact information in which the pair of contacts occur together.

31. The medium of claim 28 in which the computer-tracked communication information includes computer communication information.

32. The medium of claim 28 in which the computer-tracked communication information includes telephonic communication information.

33. The medium of claim 32 in which the telephonic communication information includes telephonic communications to or from a mobile telephone.

34. The medium of claim 28 further comprising software for providing the social map to a telephonic communication device.

35. The medium of claim 34 in which the telephonic communication device is a mobile telephone.

* * * * *